UNITED STATES PATENT OFFICE.

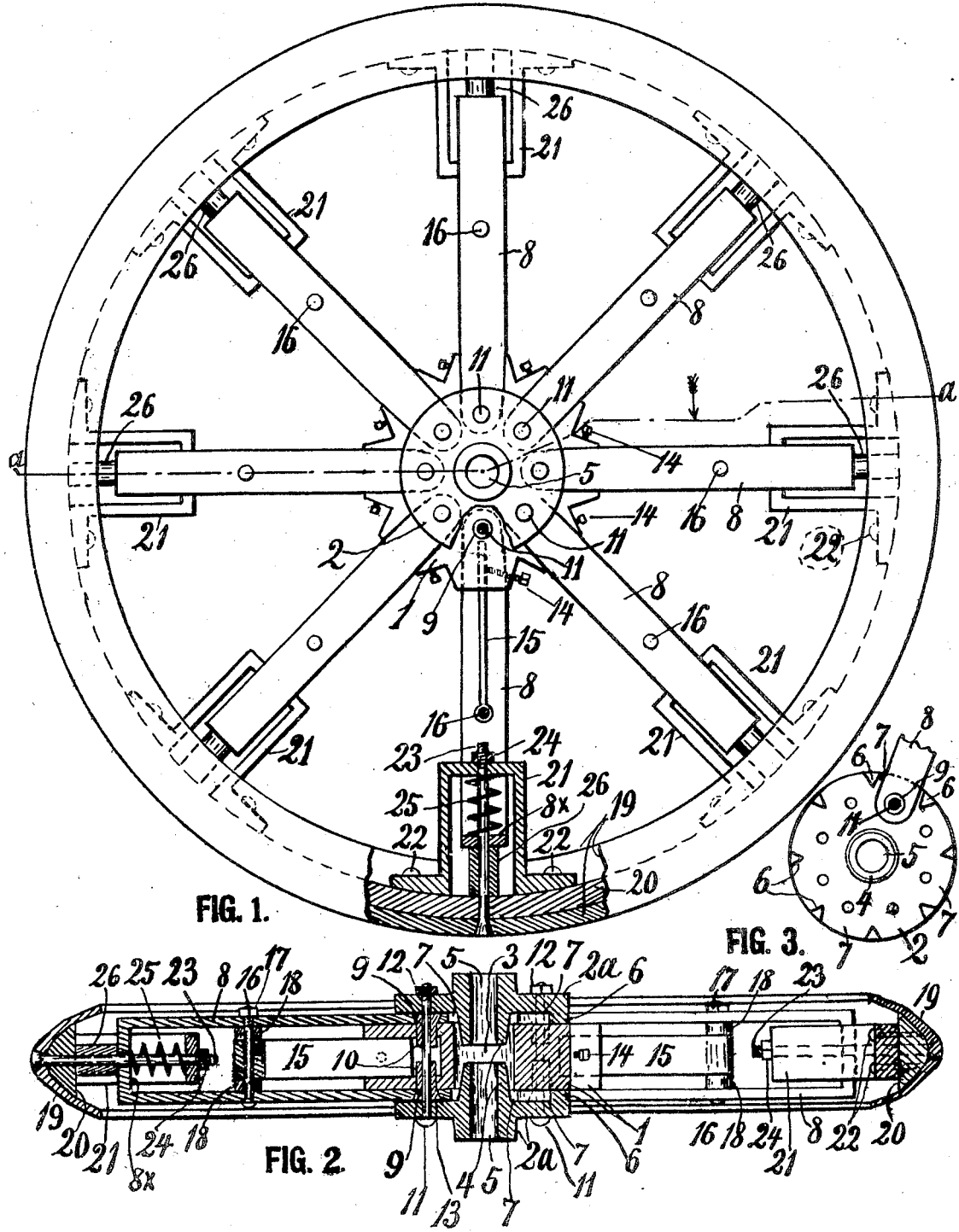

GEORGE T. McMILLAN, OF BUSHNELL, SOUTH DAKOTA.

CUSHIONED WHEEL.

1,102,423.

Specification of Letters Patent.

Patented July 7, 1914.

Application filed July 17, 1913. Serial No. 779,640½.

*To all whom it may concern:*

Be it known that I, GEORGE T. MCMILLAN, a citizen of the United States, residing at Bushnell, in the county of Brookings and State of South Dakota, have invented a new and useful Cushioned Wheel, of which the following is a specification.

My invention relates to supporting wheels for vehicles of all kinds, and may also be used as a traction or driving wheel for same.

The main object of the invention is to provide an improved wheel having internal cushions and springs which serve the purpose of external pneumatic tires, and of the various other springs usually arranged to act as cushions between the axles and the body of vehicles.

In the accompanying drawing,—Figure 1 is a partly sectional side elevation of the outer side of my improved wheel, a portion of the outer hub section, 2, half of the lower spoke, 8, and half of the hatched bottom portion of the wheel being broken away. Fig. 2 is an almost diametrical section of the wheel on the line $a$—$a$ Fig. 1. Fig. 3 is an inner side view of one of the outer hub sections of the wheel, and a portion of a spoke.

Referring to the drawing by reference numerals, the hub of the wheel is composed of an inner section 1 having a large central hole 3, and two outer or side sections, 2 and $2^a$, each of which is provided at its inner side with a projection 4 passed into the hole 3 and having a central hole 5 for the axle of the vehicle, (not shown). Each side section is also provided upon its inner side with radial lugs 6 (see Fig. 3), which contact with the sides of the inner section of the hub so as to provide spaces or pockets 7 between the sections; in said spaces are inserted the inner ends of U-shaped spokes 8, which are provided with conic apertures, in which are fitted conic portions 9 of bushings 10, which are inserted in holes in the inner section, and a bolt 11 passed through all three hub sections and through the pair of bushings in the inner ends of each of the spokes and is provided with a nut 12 by which the outer hub sections are firmly secured with their lugs 6 against the sides of the middle section 1, while the spokes 8 may swing slightly on the bushings between the adjacent lugs 6 (see Fig. 3). If the spokes become loose on the bushings from their wear on same, washers may be placed as at 13 in Fig. 2, to there- by push the cone of the bushing farther into the spoke and thus prevent rattling.

The inner hub section is provided with a series of radial sockets in which are inserted and secured by set-screws 14 the inner ends of flat spring arms 15, whose outer ends are each provided with an aperture placed upon a bolt 16, which is passed through the two arms of the U-shaped spoke and provided with a nut 17, and two collars 18, said collars serving to fill the spaces between the spoke and the spring arm 15, so that the latter may aid the spoke in resisting lateral pressure either at the hub or the felly or tire of the wheel.

19 designates the tire of the wheel; it is grooved from the inner side, and in said groove is secured a wooden felly 20, having a plain inner face, upon which is secured arched brackets 21, one bracket for each spoke in the wheel. Each bracket may be secured by two bolts 22, or by four of them as indicated to the right in Fig. 2 by showing two screws in one end of the bracket in said place.

Each of said arched brackets is passed through one of the U-shaped spokes, and a radial bolt 23 is passed through the tire, the felly, the end bar $8^x$ of the spoke and the top bar of the arched bracket and provided with a nut 24 which hold said parts firmly together, except that the spoke is slidable on the bolt. Upon said bolt is placed between the bar $8^x$ and the arch a partly compressed coil spring 25, and between the bar $8^x$ and the felly is placed a rubber cushion 26.

The operation and usefulness of the invention and its parts will be understood by supposing that the position of the wheel shown in Fig. 1 represents fairly well any and all other positions in which the wheel may be turned. It will then be seen that when the weight of axle and vehicle, and perhaps a load in the vehicle, press the hub downward, the springs 25 in the five upper spokes, and the six most horizontally disposed spring arms 15 will support such weight, and if the weight is very heavy, or the vehicle bounces on an uneven road, further support is afforded by the rubber cushions 26 at the three lowest spokes. It will also be understood that the pivot joints at the inner ends of the spokes are necessary to permit the spokes that are in or near to a horizontal position to yield to the displacement of the axle and hub slightly below the center of the wheel when the springs yield, as stated.

When the wheel is fixed on the axle, or otherwise used as a traction wheel or driver, there is, of course, a tendency to turn the hub faster than the wheel; this tendency is resisted by the stiffness of the spring arms 15; said arms being however limber enough to permit the spokes 8 to swing sufficiently at their pivot joints for the purpose described.

The tire 19 is of the V-shape shown, so as to engage sufficiently in an ordinary road to prevent lateral skidding of the wheel. The rubber cushions 26 may of course be exchanged for springs, but I prefer rubber because it is not so liable to get full of dirt, and because it offers a more positive resistance when the hub of the wheel has reached the lowest point it is designed to reach.

What I claim is:—

1. In a vehicle wheel, the combination with a hub having radial sockets about midway between its ends, and other or outer radial sockets nearer the ends of the hub; a series of U-shaped spokes having their inner ends pivotally secured in said outer sockets so as to swing slightly therein, radial spring arms secured each with one end in one of the middle sockets and having its outer end pivotally secured between the arms of the adjacent spoke; a felly, arched brackets having their inner ends within the U-shaped spokes and secured to the felly, a tire about the felly, a radial bolt passed through the tire, the felly, the outer end of each spoke, and the inner end of the adjacent bracket, a nut on the inner end of said bolt, an expansion coil spring encircling the bolt between the bracket and the spoke, and a rubber cushion upon the bolt between the felly and the spoke.

2. In a wheel of the class described, a hub composed of a middle section having a central opening and radial sockets, and two disk-like side sections one at each side of the middle section and provided with holes for the vehicle axle; said side sections having upon their inner sides radial ribs or lugs bearing against the middle section, whereby radial sockets are formed between the sections, radial spring arms fixed in the sockets of the middle section, U-shaped spokes having their arms provided with conic holes, bushings fitted in the sides of the middle section and having each conic portion fitting in the conic hole in one of the arms of the spoke, a bolt passed through the three hub sections and through the bushings in the ends of the spoke, a nut on said bolt, a bolt passed through each spoke and through the outer end of one of the spring arms and provided with a nut, and collars fitted on the bolts and filling between the spring arm and the arms of the spoke adjacent each side thereof, a felly, means attaching the felly to the ends of the spokes in a manner allowing radial movement of the spokes to and from the felly, and cushioning means arranged to resist said movement.

In testimony whereof I affix my signature, in presence of two witnesses.

GEORGE T. McMILLAN.

Witnesses:
W. H. CONKLIN,
D. J. McMILLAN.